United States Patent [19]

Studenny

[11] Patent Number: 4,489,326

[45] Date of Patent: Dec. 18, 1984

[54] TIME REFERENCE SCANNING BEAM MICROWAVE LANDING SYSTEM

[75] Inventor: John Studenny, Montreal, Canada

[73] Assignee: Canadian Marconi Company, Montreal, Canada

[21] Appl. No.: 358,265

[22] Filed: Mar. 15, 1982

[51] Int. Cl.³ .............................................. G01S 1/16
[52] U.S. Cl. .................................... 343/408; 343/378
[58] Field of Search ............... 343/407, 408, 409, 411, 343/385, 386, 387, 378; 367/42, 45; 364/609, 728, 819, 829

[56] References Cited

U.S. PATENT DOCUMENTS

| | | | |
|---|---|---|---|
| 3,495,077 | 2/1970 | Hiltz et al. | 364/604 |
| 3,906,213 | 9/1975 | Meriaux et al. | 343/378 |
| 4,017,862 | 4/1977 | Wild . | |
| 4,019,184 | 4/1977 | Dorey . | |
| 4,025,775 | 5/1977 | Beauvais et al. | 364/604 |
| 4,169,245 | 9/1979 | Crom et al. | 343/378 |
| 4,306,238 | 12/1981 | Enein | 343/408 |
| 4,306,239 | 12/1981 | Enein | 343/408 |
| 4,333,081 | 6/1982 | Höfgen | 343/407 |

OTHER PUBLICATIONS

"Time Reference Microwave Landing System Multipath Control Techniques", by R. J. Kelly, Journal of the Institute of Navigation, vol. 23, No. 1.
"Comparison Study of MLS Airborne Signal Processing Techniques", by R. J. Kelly and E. F. C. La Berge, 1978, I.E.E.E. document 78CH1336-7 NAECON.

Primary Examiner—Theodore M. Blum
Assistant Examiner—Gilberto Barrón, Jr.
Attorney, Agent, or Firm—Melvin Sher; David S. Fishman

[57] ABSTRACT

The disclosure teaches a method, and an apparatus for carrying out the method, for determining the time between TO and FRO received waveforms from the time reference scanning beam (TRSB) of a microwave landing system (MLS). In accordance with the invention, the time interval between the TO and FRO received waveforms is determined by correlating the received waveforms with apriori waveforms representative of the TO and FRO waveforms respectively. The apriori waveforms are generated by having a process construct matched filters for these waveforms. A FRO received waveform is used to provide an apriori representation of a TO received waveform and vice-versa. In one embodiment of the invention, the TO and FRO waveforms which are used to construct the matched filters are time reversed.

13 Claims, 11 Drawing Figures

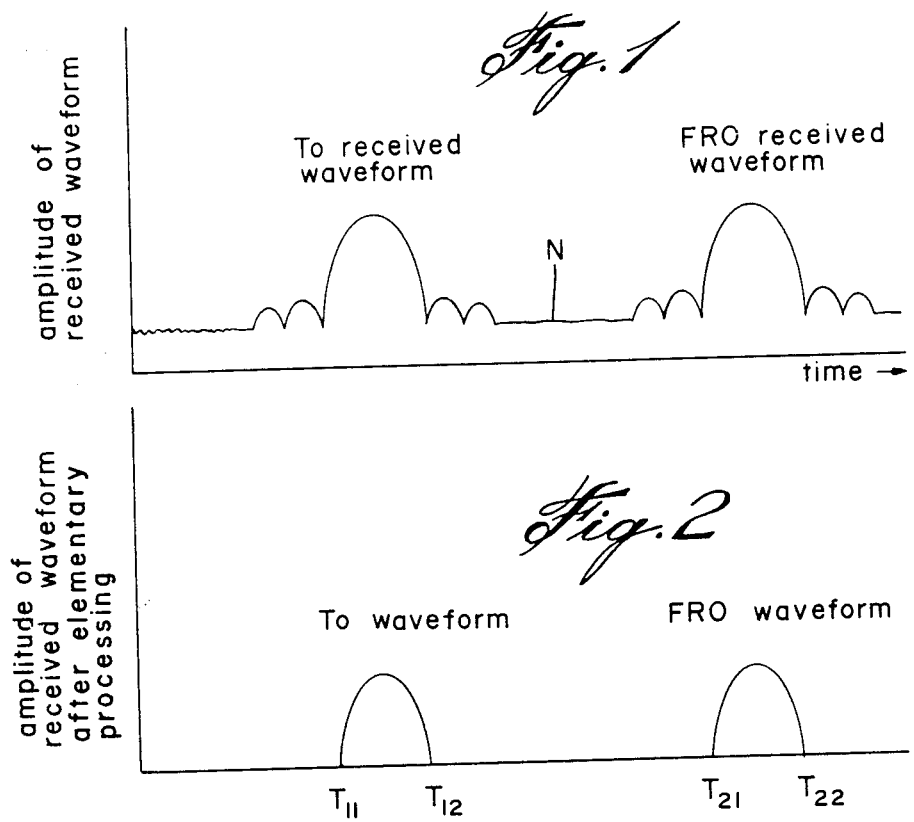
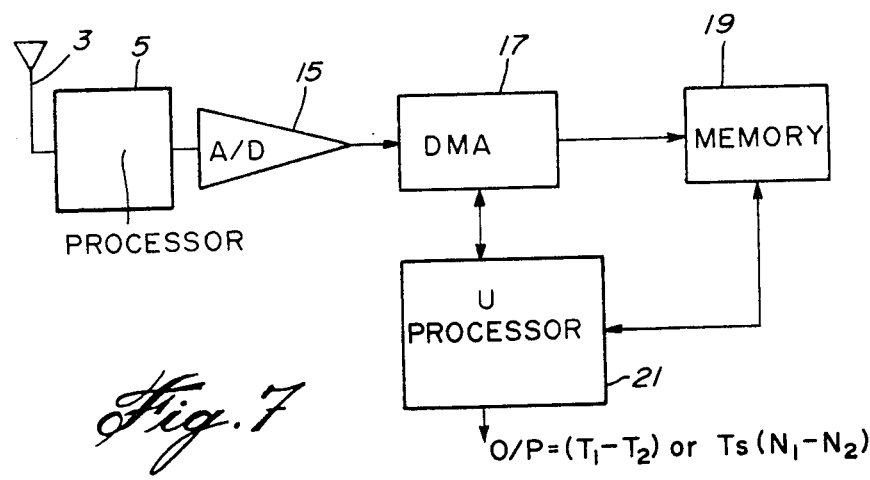

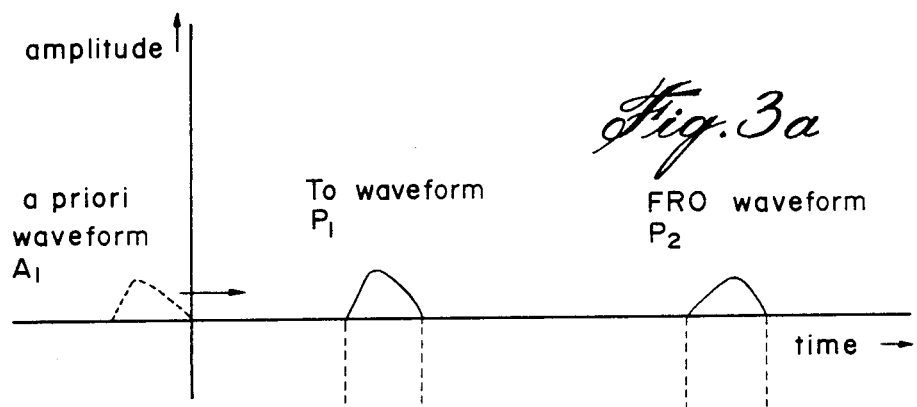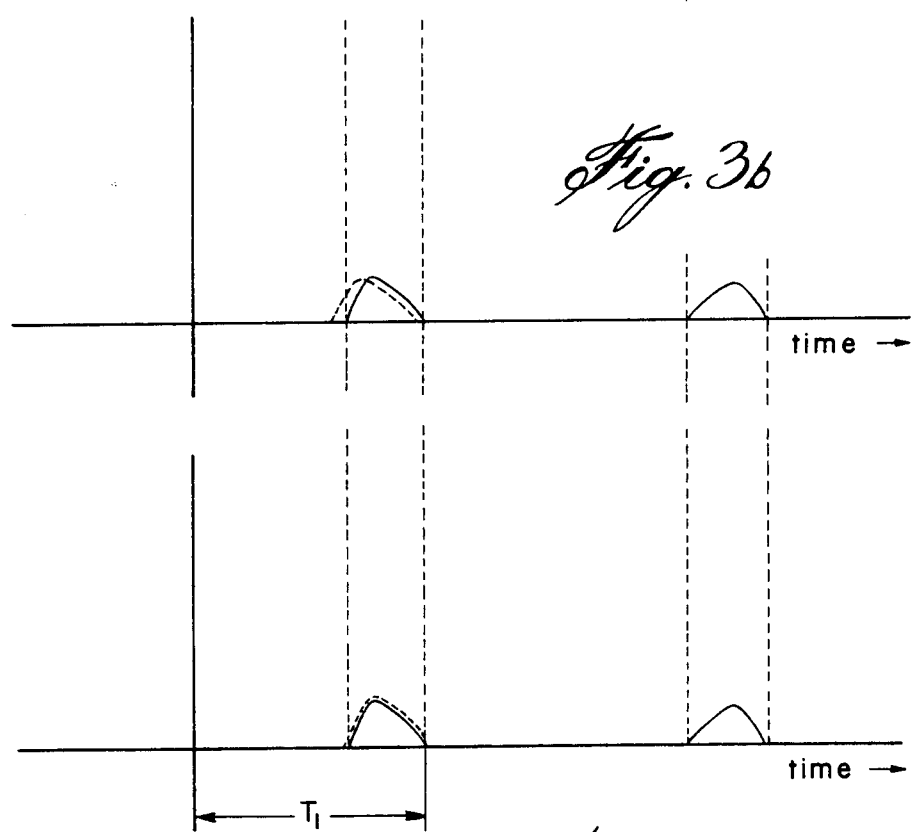

TIME REFERENCE SCANNING BEAM MICROWAVE LANDING SYSTEM

BACKGROUND OF INVENTION (a) Field of Invention

The invention relates to method steps for determining the time between TO and FRO received waveforms from the time reference scanning beam (TRSB) of a microwave landing system (MLS), and to apparatus for carrying out the method steps. More specifically, the invention relates to such method steps wherein the time interval between the TO and FRO received waveforms is determined by correlating the received waveforms, with apriori waveforms representative of the TO and FRO waveforms, respectively, and to apparatus for carrying out the method steps.

(b) Description of Prior Art

Known in the art are landing guidance systems wherein angular position information is derived from the time difference in received amplitude only signals. These received signals are created by a ground transmitting station which transmits a narrow beam of radio-frequency energy in a swept (or step) fashion and at a fixed angular rate. An example of such a landing system is the TRSB-MLS system. The back and forth sweeps are referred to as TO and FRO sweeps.

These are five known processes or processors, which are discussed in the current literature on MLS processing. These are known as a matched filter processor, a dwell gate processor, a split gate processor, a single edge processor, and a dual edge processor. Each of these processes/processors attempts to overcome noise, multipath distortion, and possible transmit beam asymmetry. Multipath distortion causes the received waveform to be distorted in shape (amplitude versus time graph) when compared to the ideal. Under certain circumstances, the distorted TO received waveform can be a mirror image of the FRO received waveform in time when their respective amplitude versus time graphs are compared. Such disadvantages form part of the system which is taught in "Time Reference Microwave Landing System Multipath Control Techniques", by R. J. Kelly, Journal of the Institute of Navigation, Vol. 23, No. 1. This invention overcomes this multipath effect problem as well as optimizing the signal in a noisy environment.

The first type, a matched filter processor, requires knowledge of an apriori received TO waveform and an apriori received FRO waveform. In case of a symmetric antenna transmit beam (and symmetric antenna received pattern) knowledge of only one is sufficient. In the event of multipath distortion of the received waveform, or if assumed apriori data is incorrect, this filter exhibits poor performance. This is due to the fact that basic apriori assumptions are no longer valid and thus increasing error results. This is documented in the paper given by R. J. Kelly and E. F. C. La Berge, "Comparison Study of MLS Airborne Signal Processing Techniques", 1978 I.E.E.E. document 78CH1336-7 NAECON.

The second type, a dwell gate processor, sets a threshold at a predetermined level below the peak value of the received TO and FRO waveforms. This process determines the time at which the received amplitude rises through the threshold, and the time at which the received amplitude fails through the the threshold. The midpoint between the rise threshold time and the fall threshold time is the reference time for the received waveform. This is done for the TO and FRO received waveforms. The measurement sought is the time between these time reference points. This process does not exhibit optimum performance in either a white noise or multipath noise environment.

The third type, a split gate process, finds the centroid of the received waveform by taking the difference of sums of a number of amplitudes on each side of a sampling point. The computation is performed about a sampling point which is shifted in the direction toward making the difference zero. Typically there are two sampling points. One is the peak amplitude, the other is variable. Linear interpolation is used to find the point at which the difference is zero. This process is superior to the dwell gate but inferior to the matched filter under white noise conditions, and inferior to the single edge processor under multipath interference conditions.

The fourth type, a single edge processor, essentially compares the change in slope of the received waveform with the change in slope of an apriori waveform. The assumption in this process is that only one edge of the received waveform is distorted and so the process is performed on the edge assumed to be undistorted. Also this process is intended to function in conjunction with the dwell gate processor. In general, this processor has superior multipath performance but poor noise performance when compared with the other methods, and exhibits poor performance if beam amplitude is too low or if both edges are distorted.

The fifth type, a dual edge processor, is a combination of two single edge processors. This was motivated by fact that both edges of the beam may be distorted and that an unbiased estimator such as a dwell gate or split gate processor would be required. The functioning is similar to the single edge processor in that both compare the change in slope of the received waveform with the change in slope of an apriori waveform. This is done for both edges and an average is taken. The multipath performance of this processor can be superior to that of the single edge processor. Again noise performance is poor compared with other methods.

TRSB-MLS systems are also taught in U.S. Pat. Nos. 4,019,184, Dorey, Apr. 19, 1977 and 4,017,862, Wild, Apr. 12, 1977. The Wild patent teaches the process of determining the time delay between the TO and FRO waveforms by cross-correlating two wavetrains produced by consecutive TO and FRO excitation.

SUMMARY OF INVENTION

It is an object of the invention to provide a method and apparatus which overcomes the disadvantages of the prior art.

It is a further object of the invention to provide a method and apparatus which minimizes the error in the measurement of the time between the TO and FRO received waveforms of a TRSB-MLS under high noise and multipath interference conditions.

In accordance with the invention there is provided a method for processing TO and FRO waveforms from the time reference scanning beam of a microwave landing system, which method includes the steps of detecting said TO and FRO waveforms, further steps for determining the time interval between the TO and FRO received waveforms, said further steps comprising: generating apriori waveforms representative, respectively, of said TO received waveform and said FRO received waveform; performing: a correlation process between said TO received waveform and the apriori waveform representative of said TO received waveform; and a correlation process between said FRO received waveform and the apriori waveform representative of said FRO received waveform; determining: the maximum correlation between the TO received waveform and the apriori waveform representative thereof; and the maximum correlation between the FRO received waveform and the apriori waveform representative thereof; to thereby determine, respectively, the times of the TO and FRO waveforms; and determining the absolute difference between said TO and FRO times.

In accordance with the invention there is provided in a receiver means for receiving TO and FRO waveforms from the time reference scanning beam of a microwave landing system, which receiver means includes detector means for detecting said TO and FRO waveforms, processing means for determining the time interval between the TO and FRO received waveforms, said processing means comprising: means for generating apriori waveforms representative, respectively, of said TO received waveform and said FRO received waveform; correlation means for performing: a correlation process between said TO received waveform and the apriori waveform representative of said TO received waveform; and a correlation process between said FRO received waveform and the apriori waveform representative of said FRO received waveform; means for determining: the maximum correlation between the TO received waveform and the apriori waveform representative thereof; and the maximum correlation between the FRO received waveform and the apriori waveform representative thereof; to thereby determine, respectively, the times of the TO and FRO received waveforms; and means for determining the absolute difference between said TO and FRO times.

BRIEF DESCRIPTION OF DRAWINGS

The invention will be better understood by an examination of the following description together with the accompanying drawings in which:

FIG. 1 is a graph of amplitude versus time of received input waveforms;

FIG. 2 is a graph of FIG. 1 with some processing and removal of noise and unwanted signals;

FIGS. 3A, 3B and 3C are graphic representations of a matched filter process implemented as a correlation receiver wherein an apriori waveform is correlated with a TO waveform;

FIG. 7 is a practical implementation of an apparatus for performing the process steps.

DESCRIPTION OF PREFERRED EMBODIMENTS

A received waveform in a TRSB/MLS receiver has the general appearance as illustrated in FIG. 1, that is, there is a TO "pulse" and FRO "pulse" separated by noise and other unwanted signals N. After some elementary processing, the waveforms, as appearing in FIG. 2, are detected and identified as well known in the art. Apriori waveforms are then correlated with a respective one of the TO or FRO received waveforms as shown in FIGS. 3A to 3C and 4A to 4C respectively.

Figure 4A:
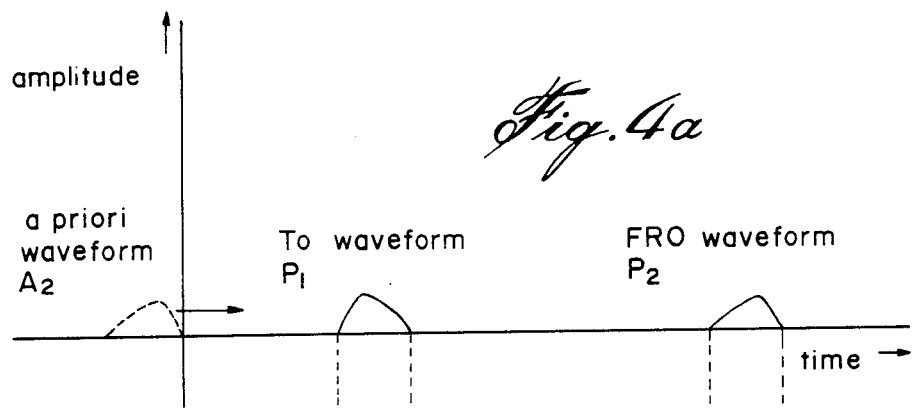
FIGS. 4A, 4B and 4C are similar to FIGS. 3A, 3B and 3C except that the correlation is with a FRO waveform.
Figure 4B:
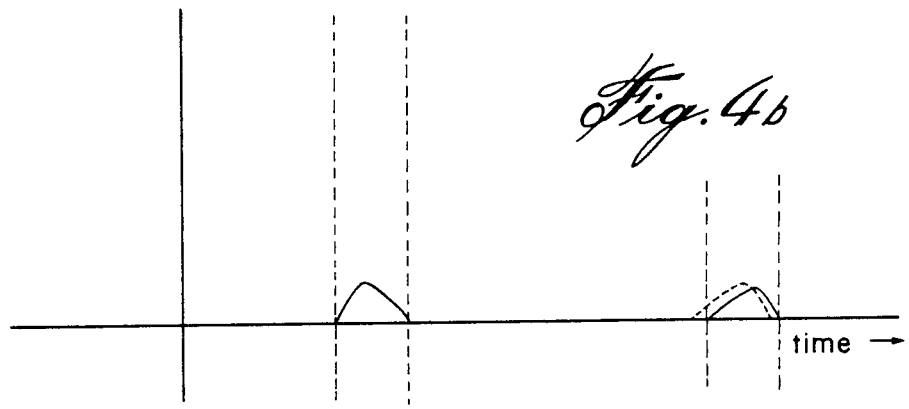
Figure 4C:
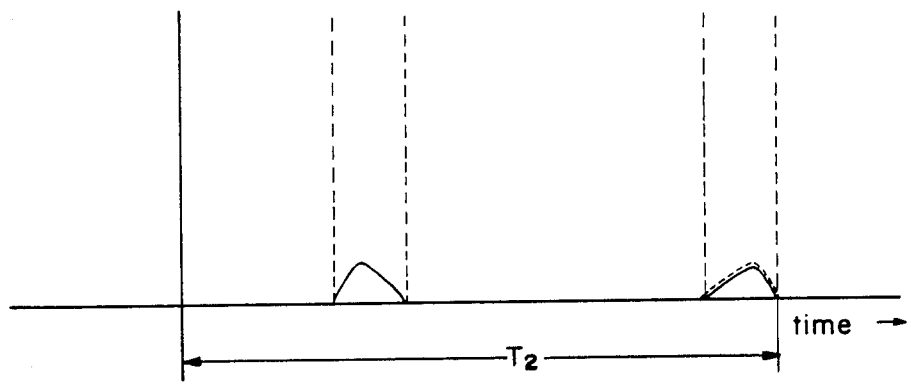

Concerning the apriori waveforms, it is contemplated to generate such apriori waveforms by having a process construct matched filters for these waveforms. The matched filters may be constructed using time reversed waveforms. With the time reversal process, a FRO received waveform is time reversed to produce the apriori representation of a TO received waveform, and a time reversed TO waveform is used as an apriori representation of the FRO received waveform. As can be seen in FIGS. 3 and 4, the apriori waveforms are time shifted until, in FIGS. 3C and 4C, the apriori waveforms coincide in time with the received waveforms. At such a time, the co-relationship between the apriori waveform and the received waveform will be at a maximum, so that to determine the time of the TO received waveform and the FRO received waveform, it is merely necessary to calculate the time shift of the apriori waveforms which produces the maximum corelation.

This is accomplished mathematically as follows:

Let the TO waveform be denoted as $P_1(t)$ and the FRO waveform as $P_2(t)$. Both $P_1$ and $P_2$ are functions of time. Let the digital representations of $P_1$ and $P_2$ be denoted as $P_1(i)$ and $P_2(i)$ respectively. Define the apriori waveforms as $A_1(t)=P_1(-t+X_1)$ and $A_2(t)=P_2(-t+X_2)$. The parameters $X_1$ and $X_2$ are chosen so that $A_1(t)$ and $A_2(t)$ are zero for $t>t_{ref}$. The parameter $t_{ref}$ in FIGS. 3A, B, C and 4A, B, C is the origin. Also, $A_1(t_{ref})$ and $A_2(t_{ref})$ are non zero. Note that $A_1(t)$ is a waveform whose shape is time reversed when compared with $P_1(t)$, and similarly for $A_2(t)$ and $P_2(t)$.

The process of finding the measurement of time between the TO and FRO received waveforms is as follows:

(1) Form the integral $I_1$.

$$I_1 = \int_{-\infty}^{\infty} A_2(t - \tau) P_1(t)\, dt$$

(2) Maximize $I_1$ by varying $\tau$ until, for a specific value say $\tau=T_1$, $|I_1|$ has maximum value.

(3) Form the integral $I_2$ $$I_2 = \int_{-\infty}^{\infty} A_1(t - \tau) P_2(t)\, dt$$

(4) Maximize $I_2$ by varying $\tau$ until, for a specific value say $\tau=T_2$, $|I_2|$ has maximum value.

The "| |" denote absolute value. The absolute value is not required if $A_1$, $A_2$, $P_1$ and $P_2$ are non negative valued functions.

The measurement sought is: $T=|T_2-T_1|$

For digital representations, the sums $S_1$ and $S_2$ are to be maximized:

$$S_1 = \sum_{i=-\infty}^{\infty} A_2(i - n) P_1(i)$$

-continued $$S_2 = \sum_{i=-\infty}^{\infty} A_1(i-n) P_2(i)$$

so that $S_1$ is maximum at $n=n_1$ and $S_2$ is maximum at $n=n_2$. If the time interval between the sampling insances is constant and is defined to be $T_s$, then the measurement that is sought is $T=T_s|n_2-n_1|$.

The matched filters may also be constructed without using time reversed waveforms. The procedure is the same as with the time reversed waveforms except that the waveforms are not time reversed. However, a FRO received waveform is used to produce the apriori representation of a TO received waveform, and a TO waveform is used to produce an apriori representation of the FRO received waveform.

The difference is mathematically represented with the following changes in the above formulae:

$$A_1(t)=P_1(\pm t+X_1)$$

and $$A_2(t)=P_2(\pm t+X_2).$$

Figure 5:
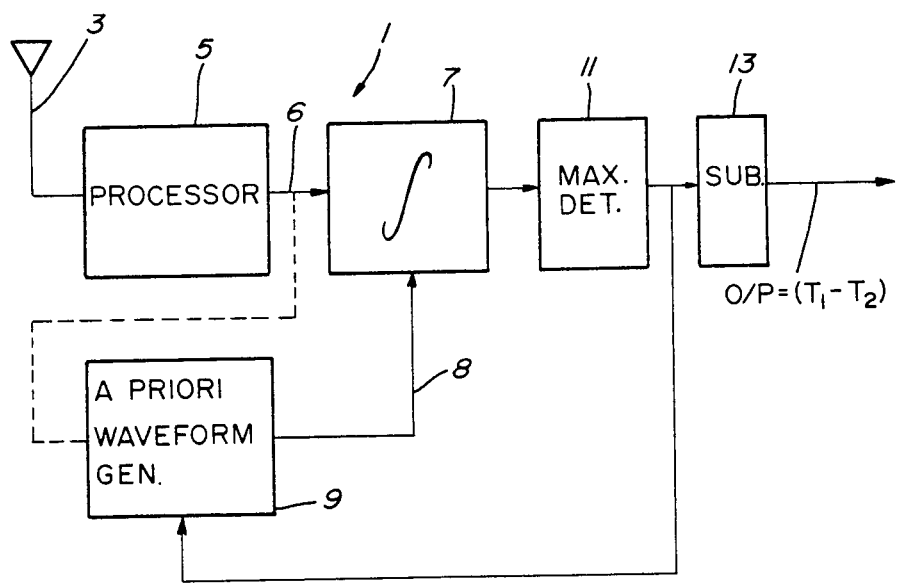
FIG. 5 is a purely schematic representation of an analog apparatus for performing the process steps.

Turning now to FIG. 5 of the drawings, a receiver, indicated generally at 1, includes an antenna 3 and a processor 5 for removing noise and other unwanted signals. Such a processor is well known in the art and requires no further description here.

The means for carrying out the inventive steps include an integrator 7 and an apriori waveform generator 9. As above discussed, when the processor performs using analog techniques, an integration is performed of the product of the received waveform and its apriori representation. Thus, the received waveform is fed to one terminal of the integrator through conductive means 6 whereas the apriori waveform is fed to another terminal of the integrator through conductive means 8. When the apriori waveform constitutes the time reversed received waveform, the received waveform is provided to an input of the waveform generator 9 through the dotted line.

The output of the integrator is fed to a maximum detector, and the time $T_1$ is determined as above described. The time $T_2$ is similarly determined, and the absolute difference of these two is calculated in subtractor 13.

Figure 6:
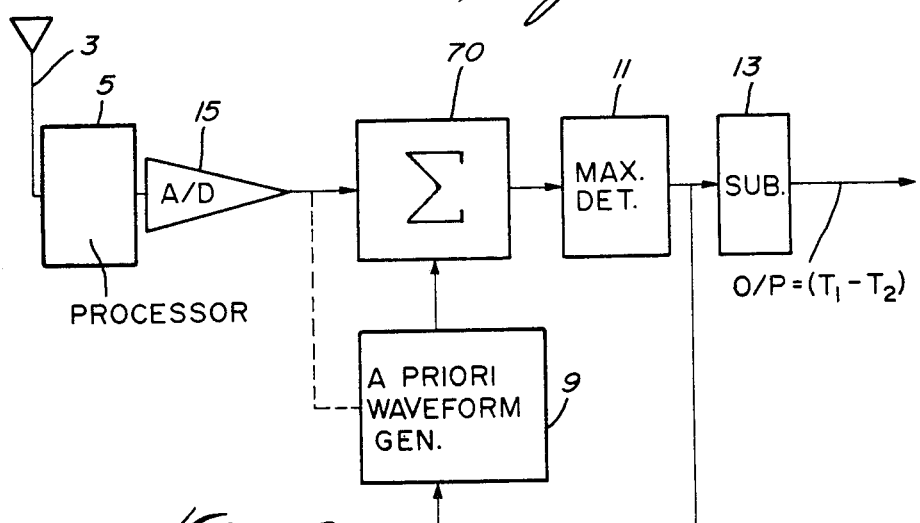
FIG. 6 is a purely schematic representation of a digital apparatus for performing the process steps.

FIG. 6 illustrates a digital approach to carrying out the process. In FIG. 6, the analog signal is converted to a digital signal in A/D converter 15. The output of this converter is fed to a summation means 70 at one terminal thereof, while the other terminal thereof is fed with the output of apriori waveform generator 9. Once again, the maximums are detected and the times $T_1$ and $T_2$ are determined as above described. The difference is then calculated in subtractor 13.

It will be appreciated that the apparatus illustrated in FIGS. 5 and 6 are purely schematic representations of useable apparatus. A more practical approach is shown in FIG. 7. Referring to FIG. 7, the system will once again include receiving antenna 3, a processor 5, and an analog to digital converter 15. The output of the converter is fed to direct memory access (DMA) means 17 which has access to both a memory device 19 and a microprocessor 21. The microprocessor is appropriately programmed to carry out the process as above described.

The inventive method and apparatus overcome the disadvantages suffered by the prior art for the following reasons:

1. Mathematically, the correlation process is optimum. No other process is superior in additive white Gaussian noise.

2. When time reversed TO and FRO received waveforms are used as the apriori waveform, any multipath distortion which affects a waveform will also affect its apriori waveform. Thus, the distortion in both the received and its apriori waveforms should be very similar so that these distortions will not upset calculations of received times.

3. The method does not rely on any assumptions as do some of the prior art methods. In addition, the method does not rely on any particular beam geometry so should there by any change in beam geometries, the calculations will not be adversely affected.

Although several embodiments have been discussed, this was for the purpose of illustrating, but not limiting, the invention. Various modifications which will come readily to the mind of one skilled in the art, are within the scope of the invention as defined in the appended claims.

I claim:

1. In a method for processing TO and FRO waveforms from the time reference scanning beam of a microwave landing system, which method includes the steps of detecting said TO and FRO waveforms, further steps for determining the time interval between the TO and FRO received waveforms, said further steps comprising:
   generating apriori waveforms representative, respectively, of said TO received waveform and said FRO received waveform;
   performing:
   a correlation process between said TO received waveform and the apriori waveform representative of said TO received waveform; and
   a correlation process between said FRO received waveform and the apriori waveform representative of said FRO received waveform;
   determining:
   the maximum correlation between the TO received waveform and the apriori waveform representative thereof; and
   the maximum correlation between the FRO received waveform and the apriori waveform representative thereof;
   to thereby determine, respectively, the times of the TO and FRO waveforms; and
   determining the absolute difference between said TO and FRO times.

2. A process as defined in claim 1 wherein said apriori waveform is generated by constructing a matched filter.

3. A process as defined in claim 2 and carried out by analog techniques, whereby, said correlation process is carried out by the process of integration.

4. A process as defined in claim 3 wherein the apriori waveform representation of said TO waveform is the time reversed FRO waveform, and the apriori waveform representation of said FRO waveform is the time reversed TO waveform, said integration process is carried out as follows:
   (1) Form the integral I $$I_1 = \int_{-\infty}^{\infty} A_2(t - \tau) P_1(t) dt$$

(2) Maximize $I_1$ by varying $\tau$ until, for a specific value say $\tau = T_1$,
 $|I_1|$ has maximum value
(3) Form the integral $I_2$ $$I_2 = \int_{-\infty}^{\infty} A_1(t - \tau) P_2(t) dt$$

(4) Maximize $I_2$ by varying $\tau$ until, for a specific value say $\tau = T_2$,
 $|I_2|$ has maximum value
wherein the time interval $T = |T_2 - T_1|$
wherein:
  $P_1(t)$ denotes the TO waveform
  $P_2(t)$ denotes the FRO waveform
  $A_1(t) = P_1(-t+X_1)$ $A_2(t) = P_2(-t+X_2)$
  the parameters $X_1$ and $X_2$ being chosen so that $A_1(t)$ and $A_2(t)$ are 0 for $t > t_{ref}$.

5. A process as defined in claim 3 wherein the apriori waveform representation of said TO waveform is the FRO waveform, and the apriori waveform representation of said FRO waveform is the TO waveform, said integration process is carried out as follows:
(1) Form the integral I $$I_1 = \int_{-\infty}^{\infty} A_2(t - \tau) P_1(t) dt$$

(2) Maximize $I_1$ by varying $\tau$ until, for a specific value say $\tau = T_1$,
 $|I_1|$ has maximum value
(3) Form the integral $I_2$ $$I_2 = \int_{-\infty}^{\infty} A_1(t - \tau) P_2(t) dt$$

(4) Maximize $I_2$ by varying $\tau$ until, for a specific value say $\tau = T_2$,
 $|I_2|$ has maximum value
wherein the time interval $T = |T_2 - T_1|$
wherein:
  $P_1(t)$ denotes the TO waveform
  $P_2(t)$ denotes the FRO waveform
  $A_1(t) = P_1(t+X_1)$
  $A_2(t) = P_2(t+X_2)$
  the parameters $X_1$ and $X_2$ being chosen so that $A_1(t)$ and $A_2(t)$ are 0 for $t > t_{ref}$.

6. A process as defined in claim 2 and carried out by digital techniques, whereby, said correlation process is carried out by the summation process.

7. A process as defined in claim 6 wherein the apriori waveform representation of said TO waveform is the time reversed FRO waveform, and the apriori waveform representation of said FRO waveform is the time reversed TO waveform, said summation process is carried out as follows:
(1) Form the sum $S_1$ $$S_1 = \sum_{i=-\infty}^{\infty} A_2(i - n) P_1(i)$$

(2) Maximize $S_1$ by varying n until, for a specific value, say $n = n_1$,
 $|S_1|$ has a maximum value
(3) Form the sum $S_2$ $$S_2 = \sum_{i=-\infty}^{\infty} A_1(i - n) P_2(i)$$

(4) Maximize $S_2$ by varying n until, for a specific value, say $n = n_2$,
 $|S_2|$ has a maximum value
 the time interval between sampling instances being constant at a time $T_s$
whereby the time interval $T = T_s|n_2 - n_1|$
wherein:
  $P_1(t)$ denotes the TO waveform
  $P_2(t)$ denotes the FRO waveform
  $A_1(t) = P_1(-t+X_1)$
  $A_2(t) = P_2(-t+X_2)$
  the parameters $X_1$ and $X_2$ being chosen so that $A_1(t)$ and $A_2(t)$ for 0 for $t > t_{ref}$.

8. A process as defined in claim 6 wherein the apriori waveform representation of said TO waveform is the FRO waveform, and the apriori waveform representation of said FRO waveform is the TO waveform, said summation process is carried out as follows:
(1) Form the sum $S_1$ $$S_1 = \sum_{i=-\infty}^{\infty} A_2(i - n) P_1(i)$$

(2) Maximize $S_1$ by varying n until, for a specific value, say $n = n_1$,
 $|S_1|$ has a maximum value
(3) Form the sum $S_2$ $$S_2 = \sum_{i=-\infty}^{\infty} A_1(i - n) P_2(i)$$

(4) Maximize $S_2$ by varying n until, for a specific value, say $n = n_2$,
 $|S_2|$ has a maximum value
 the time interval between sampling instances being constant at a time $T_s$
whereby the time interval $T = T_s|n_2 - n_1|$
wherein:
  $P_1(t)$ denotes the TO waveform
  $P_2(t)$ denotes the FRO waveform
  $A_1(t) = P_1(t+X_1)$
  $A_2(t) = P_2(t+X_2)$
  the parameters $X_1$ and $X_2$ being chosen so that $A_1(t)$ and $A_2(t)$ are 0 for $t > t_{ref}$.

9. In a receiver means for receiving TO and FRO waveforms from the time reference scanning beam of a microwave landing system, which receiver means includes detector means for detecting said TO and FRO waveforms, processing means for determining the time interval between the TO and FRO received waveforms, said processing means comprising:
  means for generating apriori waveforms representative, respectively, of said TO received waveform and said FRO received waveform;

correlation means for performing:
a correlation process between said TO received waveform and the apriori waveform representative of said TO received waveform; and
a correlation process between said FRO received waveform and the apriori waveform representative of said FRO received waveform;
means for determining:
the maximum correlation between the TO received waveform and the apriori waveform representative thereof; and
the maximum correlation between the FRO received wavefrom and the apriori waveform representative thereof;
to thereby determine, respectively, the times of the TO and FRO received waveforms; and
means for determining the absolute difference between said TO and FRO times.

10. Processing means as defined in claim 9 wherein said means for generating an apriori waveform comprises means for constructing a matched filter.

11. Processing means as defined in claim 10 wherein said means for performing correlation comprises integration means.

12. Processing means as defined in claim 10 wherein said means for performing correlation comprises summation means.

13. Processing means as defined in claim 9 wherein said means for generating apriori waveforms comprises means for time reversing said TO and said FRO received waveforms.

* * * * *